(12) United States Patent
Duval et al.

(10) Patent No.: US 10,015,829 B2
(45) Date of Patent: Jul. 3, 2018

(54) CONTROLLING INTERFERENCE

(71) Applicant: FUJITSU LIMITED, Kawasaki-shi, Kanagawa (JP)

(72) Inventors: Olivier Duval, San Mateo, CA (US); Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/909,082

(22) PCT Filed: Apr. 2, 2014

(86) PCT No.: PCT/US2014/032721
§ 371 (c)(1),
(2) Date: Jan. 29, 2016

(87) PCT Pub. No.: WO2015/016986
PCT Pub. Date: Feb. 5, 2015

(65) Prior Publication Data
US 2016/0174101 A1 Jun. 16, 2016

Related U.S. Application Data

(60) Provisional application No. 61/861,402, filed on Aug. 1, 2013.

(51) Int. Cl.
*H04W 52/24* (2009.01)
*H04W 76/02* (2009.01)
(Continued)

(52) U.S. Cl.
CPC ........ *H04W 76/023* (2013.01); *H04B 7/0456* (2013.01); *H04B 7/0617* (2013.01);
(Continued)

(58) Field of Classification Search
CPC .. H04W 52/241–52/244; H04W 24/00–24/10; H04W 72/00–72/14;
(Continued)

(56) References Cited

U.S. PATENT DOCUMENTS

| 5,850,592 A | 12/1998 | Ramanathan |
| 6,493,759 B1 | 12/2002 | Passman et al. |

(Continued)

OTHER PUBLICATIONS

U.S. Office Action issued in corresponding U.S. Appl. No. 14/909,080, dated Jun. 22, 2017.
(Continued)

*Primary Examiner* — Raymond Dean
(74) *Attorney, Agent, or Firm* — Maschoff Brennan

(57) ABSTRACT

A method of controlling interference may include receiving interference parameters. The method may further include determining an interference measurement of a resource element. The interference measurement may be associated with a first location. The method may further include calculating a maximum transmission power of the resource element based at least in part on the interference parameters and the interference measurement. The method may further include transmitting a transmission via the resource element, the transmission including a transmission power equal to or less than the maximum transmission power.

19 Claims, 6 Drawing Sheets

(51) Int. Cl.

| | | |
|---|---|---|
| *H04W 8/00* | (2009.01) | |
| *H04B 7/0456* | (2017.01) | |
| *H04B 7/06* | (2006.01) | |
| *H04W 4/00* | (2018.01) | |
| *H04W 24/02* | (2009.01) | |
| *H04W 74/00* | (2009.01) | |
| *H04W 72/04* | (2009.01) | |
| *H04W 8/18* | (2009.01) | |
| *H04W 56/00* | (2009.01) | |
| *H04W 72/10* | (2009.01) | |

(52) U.S. Cl.
CPC .......... *H04B 7/0639* (2013.01); *H04W 4/005* (2013.01); *H04W 8/005* (2013.01); *H04W 8/186* (2013.01); *H04W 24/02* (2013.01); *H04W 52/241* (2013.01); *H04W 52/242* (2013.01); *H04W 52/243* (2013.01); *H04W 56/001* (2013.01); *H04W 72/042* (2013.01); *H04W 72/0406* (2013.01); *H04W 72/0413* (2013.01); *H04W 72/0446* (2013.01); *H04W 72/0473* (2013.01); *H04W 72/10* (2013.01); *H04W 74/006* (2013.01)

(58) Field of Classification Search
CPC ... H04W 8/005; H04W 8/186; H04W 56/001; H04W 74/006; H04B 7/0456; H04B 7/0617; H04B 7/0639
USPC ..................... 455/63.1, 67.13, 522
See application file for complete search history.

(56) References Cited

U.S. PATENT DOCUMENTS

| | | | |
|---|---|---|---|
| 6,711,409 B1 | 3/2004 | Zavgren, Jr. et al. | |
| 7,978,631 B1 | 7/2011 | Abdelaziz et al. | |
| 8,229,494 B1 | 7/2012 | Kela et al. | |
| 8,355,736 B2 | 1/2013 | Mitra et al. | |
| 2006/0045130 A1 | 3/2006 | Kim et al. | |
| 2007/0010270 A1* | 1/2007 | Dillon | H04W 52/243 455/513 |
| 2007/0165569 A1* | 7/2007 | Kaminski | H04W 16/10 370/329 |
| 2007/0254643 A1 | 11/2007 | Garcia et al. | |
| 2008/0253327 A1 | 10/2008 | Kohvakka et al. | |
| 2009/0034432 A1 | 2/2009 | Bonta et al. | |
| 2010/0075689 A1* | 3/2010 | Uemura | H04W 52/0206 455/452.1 |
| 2010/0093364 A1* | 4/2010 | Ribeiro | H04W 72/082 455/452.2 |
| 2010/0148940 A1 | 6/2010 | Gelvin et al. | |
| 2010/0291962 A1* | 11/2010 | Kim | H04W 52/242 455/522 |
| 2010/0303034 A1 | 12/2010 | Chen et al. | |
| 2011/0032909 A1 | 2/2011 | Park et al. | |
| 2011/0081942 A1 | 4/2011 | Wengerter et al. | |
| 2011/0151887 A1* | 6/2011 | Hakola | H04W 72/0453 455/452.2 |
| 2011/0319097 A1* | 12/2011 | Wirola | H04W 16/18 455/456.1 |
| 2012/0021704 A1 | 1/2012 | Chan et al. | |
| 2012/0087306 A1 | 4/2012 | Kim et al. | |
| 2012/0129540 A1 | 5/2012 | Hakola et al. | |
| 2012/0236909 A1 | 9/2012 | Ma et al. | |
| 2013/0138792 A1 | 5/2013 | Preden et al. | |
| 2013/0308714 A1 | 11/2013 | Xu et al. | |
| 2013/0308715 A1 | 11/2013 | Nam et al. | |
| 2014/0098759 A1 | 4/2014 | Noh et al. | |
| 2014/0098761 A1 | 4/2014 | Lee et al. | |
| 2014/0177683 A1 | 6/2014 | Krishnamurthy et al. | |
| 2014/0328329 A1 | 11/2014 | Novlan et al. | |
| 2014/0376458 A1 | 12/2014 | Ryu et al. | |
| 2015/0016312 A1 | 1/2015 | Li et al. | |
| 2015/0173105 A1 | 6/2015 | Bergstrom et al. | |
| 2015/0223279 A1 | 8/2015 | Jiao et al. | |
| 2015/0257173 A1 | 9/2015 | You et al. | |
| 2015/0296518 A1 | 10/2015 | Yi et al. | |
| 2015/0359004 A1 | 12/2015 | Xu et al. | |
| 2016/0142981 A1 | 5/2016 | Yi et al. | |
| 2016/0150570 A1 | 5/2016 | Wang et al. | |

OTHER PUBLICATIONS

U.S. Office Action issued in corresponding U.S. Appl. No. 14/908,980, dated Aug. 11, 2017.
U.S. Office Action issued in U.S. Appl. No. 14/908,858, dated Sep. 15, 2017.
U.S. Office Action issued in U.S. Appl. No. 14/908,974, dated Sep. 6, 2017.
U.S. Office Action dated Jan. 23, 2018 in U.S. Appl. No. 14/908,974.
Advisory Action dated Apr. 26, 2018 in U.S. Appl. No. 14/908,974.
Non-Final Office Action dated Apr. 23, 2018 in U.S. Appl. No. 14/909,080.

\* cited by examiner

CONTROLLING INTERFERENCE

FIELD

The embodiments discussed herein are related to controlling interference.

BACKGROUND

Terminal-to-terminal communication may allow data transmissions to be made directly between two or more terminals of a telecommunication system. The terminal-to-terminal communication may overlay regular cellular communications, and may be performed with or without cellular network coverage.

In some instances, using terminal-to-terminal communication may increase network capacity. For example, terminal-to-terminal communication may permit spatial multiplexing, which may allow for higher relative spectrum usage. Employing terminal-to-terminal communication may also permit throughput between terminals to be increased if a terminal-to-terminal link experiences better channel quality than a cellular link. Using terminal-to-terminal communication may reduce resource usage when data is transmitted once between two terminals during a terminal-to-terminal transmission, as compared to transmitting the same data twice between the two terminals over a cellular link, i.e., once through an uplink (UL) transmission from a transmitting terminal to a base station and once through a downlink (DL) transmission to a receiving terminal from the base station.

Terminal-to-terminal communication may reduce communication latency of a telecommunication network. For example, terminal-to-terminal communication may not relay data through a base station and/or a core network, thus potentially reducing the transit time of the data and/or the load on the base station and/or the core network.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of controlling interference may include receiving interference parameters. The method may further include determining an interference measurement of a resource element. The interference measurement may be associated with a first location. The method may further include calculating a maximum transmission power of the resource element based at least in part on the interference parameters and the interference measurement. The method may further include transmitting a transmission via the resource element, the transmission including a transmission power equal to or less than the maximum transmission power.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein may relate to a telecommunication system based on the 3rd Generation Partnership Project's (3GPP) Long Term Evolution (LTE) radio access network. Descriptions involving LTE may also apply to 3GPP's Long Term Evolution Advanced (LTE-A) radio access network. However, the embodiments described herein are not limited to the example telecommunication systems described. Rather, the embodiments described herein may also be applicable to other telecommunication systems.

Some embodiments may relate to controlling interference from terminal-to-terminal communications in a telecommunication system. The interference controlling may occur with or without cellular network coverage.

Embodiments of the present invention will be explained with reference to the accompanying drawings.

Figure 1:
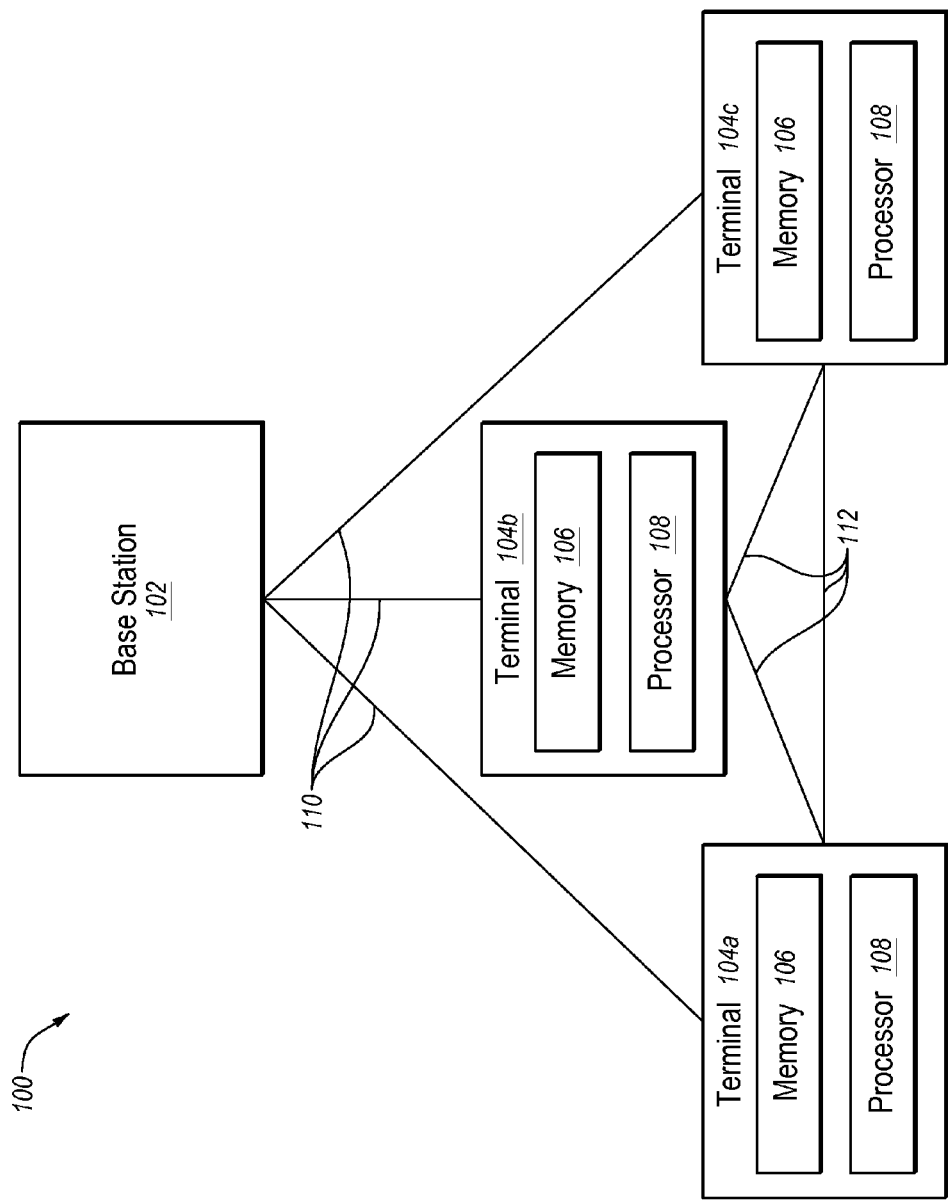
FIG. 1 is a diagrammatic view of an example telecommunication system.

FIG. 1 is a diagrammatic view of an example telecommunication system 100, arranged in accordance with at least one embodiment described herein. In some embodiments, a network architecture of the telecommunication system 100 may include the network architecture of an Evolved Universal Mobile Telecommunications System (E-UMTS). The E-UMTS may include an LTE radio access network, for instance. The radio access network may include an E-UMTS Terrestrial Radio Access Network (E-UTRAN). However, other types of network architecture may alternately or additionally be used.

The telecommunication system 100 may include a base station 102. The base station 102 may include base station equipment, including hardware and/or software for radio communication with radio-communication-equipped nodes ("wireless nodes"). For example, the base station 102 may be equipped for radio communication 110 with wireless nodes such as terminal 104a, terminal 104b, and terminal 104c (collectively "terminals 104"). The base station 102 may generally allow the wireless nodes, including the terminals 104, to wirelessly communicate with each other and/or to wirelessly access a network (not shown) via radio communication 110 with the base station 102.

The base station 102 may include hardware and/or software for radio communication over a licensed spectrum. The licensed spectrum may generally include portions of a radio spectrum licensed for transmission of wireless data, such as cellular data. For example, the base station 102 may be configured to transmit cellular data that complies with an LTE radio access network, such as an LTE radio access network according to 3GPP LTE specification releases 8-12. The base station 102 may include an E-UTRAN NodeB (eNB) associated with LTE radio access networks.

The terminals 104 may include equipment configured to allow the terminals 104 to transmit and receive data via wireless communications via the licensed spectrum. For example, the terminals 104 may include hardware, such as one or more antennas for transmitting and receiving radio transmissions, and codecs. The terminals 104 may include mobile phones, tablet computers, laptop computers, and/or other electronic devices that may use radio communication. Alternately or additionally, the terminals 104 may include devices that employ machine-type communication (MTC). The terminals 104 may include user equipment (UE) associated with LTE radio access networks.

Each of the terminals 104 may include memory 106 and a processor 108. The memory 106 may include a non-transitory computer-readable medium. Instructions such as programming code executable by the processor 108 may be encoded in the memory 106. When the instructions are executed by the processor 108, the associated terminals 104a, 104b, and 104c may perform operations related to and/or including the processes described herein.

The terminals 104 may be equipped for terminal-to-terminal communication 112, which may include device-to-device (D2D) communication associated with LTE radio access networks. The terminal-to-terminal communication 112 may allow the terminals 104 to transmit and/or receive data among the terminals 104 without routing the data through the base station 102.

The radio communication 110 and the terminal-to-terminal communication 112 may contribute to interference experienced in the telecommunication system 100. A radio communication channel of the telecommunication system 100 may experience interference when a receiver such as the base station 102 and/or the terminals 104 experiences electromagnetic power from an unintended source that reduces the achievable rate of transmission. In some instances, the base station 102 may manage the radio communication 110 to maintain manageable levels of interference for the terminals 104. The base station 102 may alternately or additionally communicate with other base stations (not shown) to maintain manageable levels of interference for the terminals 104 and/or other terminals (not shown) associated with the other base stations.

Figure 2:
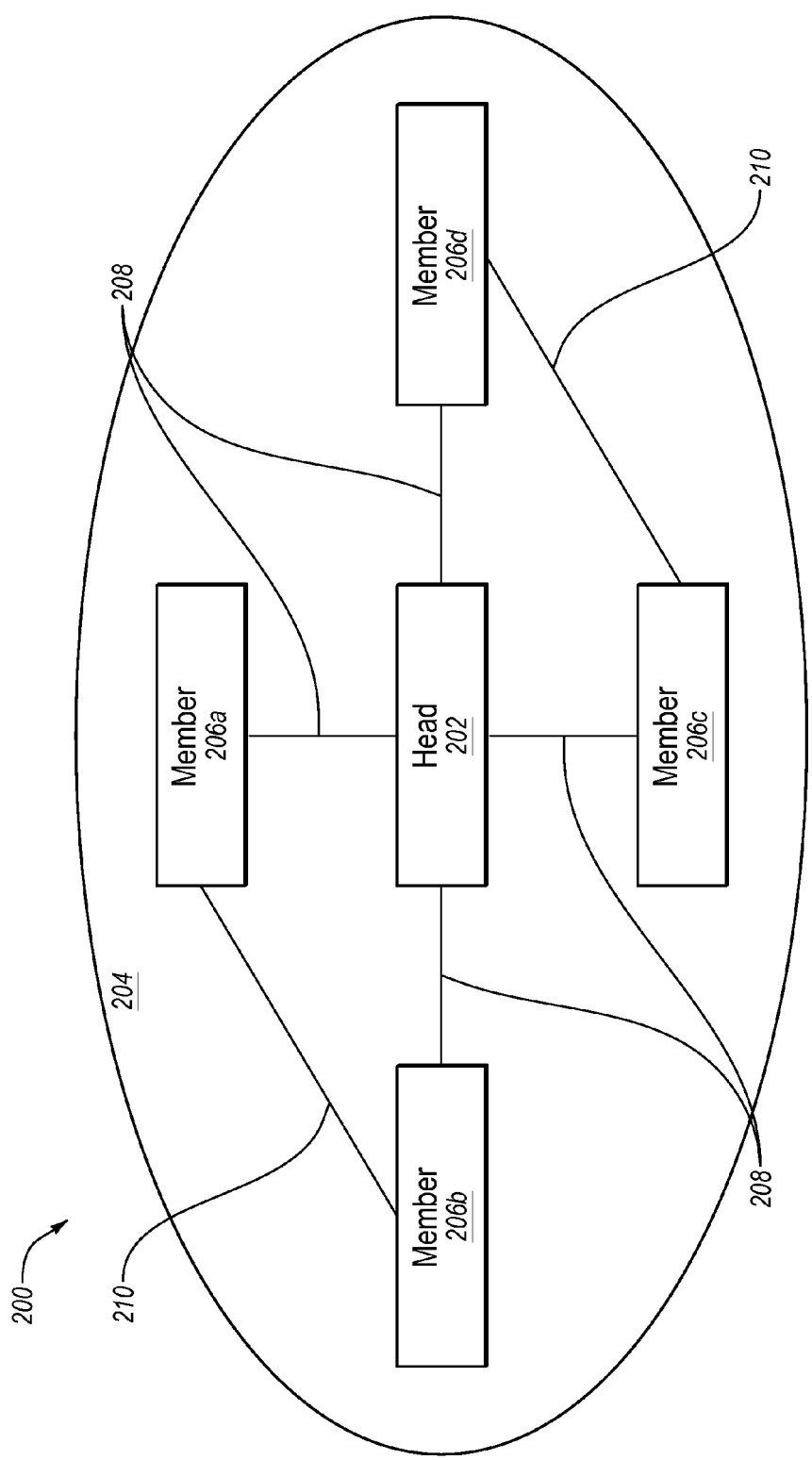
FIG. 2 is a diagrammatic view of an example cluster that may be implemented in the telecommunication system of FIG. 1.

FIG. 2 is a diagrammatic view of an example cluster 200. The cluster 200 may be implemented in the telecommunication system 100 of FIG. 1. The cluster 200 may include a cluster head 202. The cluster 200 may also include a cluster member 206a, a cluster member 206b, a cluster member 206c, and a cluster member 206d (collectively "cluster members 206"). The cluster members 206 may be terminals generally corresponding to the terminals 104 of FIG. 1. The cluster members 206 may be within a transmission range 204 of the cluster head 202. The cluster members 206 may or may not be within a transmission range (not shown) of each of the other cluster members 206. The cluster 200 may enable cluster-member-to-cluster-member communication 210. The cluster-member-to-cluster-member communication 210 may generally correspond to the terminal-to-terminal communication 112 of FIG. 1.

In some embodiments, the cluster head 202 may be a base station generally corresponding to the base station 102 of FIG. 1. For example, a base station may be the cluster head 202 for cluster members 206 located within a cell generally corresponding to the transmission range 204 of the base station. One or more terminals associated with the base station for cellular communication may be cluster members 206. In embodiments including a base station as the cluster head 202, a cluster-member-to-cluster-head communication 208 may generally correspond to the radio communication 110 of FIG. 1.

Alternately, the cluster head 202 may be a terminal generally corresponding to the terminals 104 of FIG. 1. For example, a terminal may be the cluster head 202 for cluster members 206 located within a transmission range 204 of the terminal acting as the cluster head 202. In embodiments including a terminal as the cluster head 202, the cluster-member-to-cluster-head communication 208 may generally correspond to the terminal-to-terminal communication 112 of FIG. 1. The cluster head 202 and/or one or more of the cluster members 206 may be outside of cellular network coverage, e.g., the cluster head 202 and/or one or more of the cluster members 206 may be outside of a transmission range of a base station generally corresponding to the base station 102 of FIG. 1.

In some embodiments, the cluster head 202 may serve as an intermediary between the cluster members 206 and one or more other cluster heads (not shown) associated with one or more other clusters (not shown).

In some instances, the cluster 200 may be located entirely or partially within cellular network coverage. In some embodiments, the cluster head 202 may serve as an intermediary for communication between a base station and the cluster members 206. In some embodiments, the cluster 200 may be located entirely or partially within another cluster (not shown).

Figure 3:
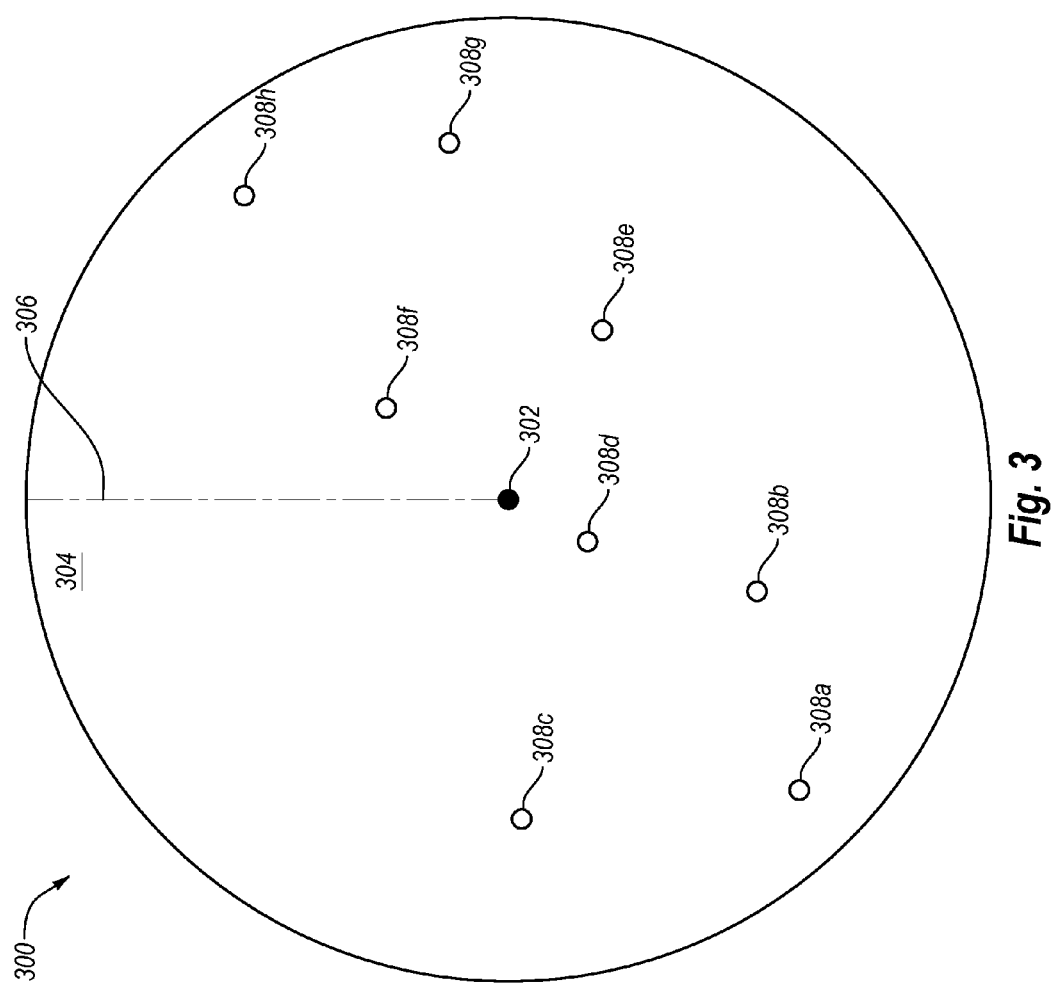
FIG. 3 is a diagrammatic view of an example telecommunication zone that may be implemented in the telecommunication system of FIG. 1.

FIG. 3 is a diagrammatic view of an example telecommunication zone 300. The telecommunication zone 300 may be implemented in the telecommunication system 100 of FIG. 1. The telecommunication zone 300 may include a superior node 302. The superior node 302 may generally correspond to the base station 102 of FIG. 1 and/or the cluster head 202 of FIG. 2.

The superior node 302 may be associated with an approximately circular communication area 304. The communication area 304 may have an approximate radius 306. The communication area 304 may be associated with a transmission range of the superior node 302. If the superior node 302 is a base station, the communication area 304 may generally correspond to a cell of the base station. If the superior node 302 is a cluster head, the communication area 304 may generally correspond to a transmission range 204 of FIG. 2.

The zone 300 may further include terminals 308a through 308h (collectively "terminals 308"). The terminals 308 may include terminals performing terminal-to-terminal communication and/or terminals performing cellular communication. In some instances, the terminals 308 may form one or more clusters generally corresponding to the cluster 200 of FIG. 2. One or more terminals 308 may transmit transmissions and may potentially cause interference with other terminals 308 and/or base stations (not shown). The transmitting terminals 308 may be described herein as aggressors. The terminals 308 and/or the base stations that may potentially receive interference from the aggressors may be described herein as victims. The aggressors may include terminals 308 performing terminal-to-terminal transmissions.

The aggressors may perform interference-avoiding techniques. For example, the aggressors may transmit in resources orthogonal to the resources used by one or more victims. Transmitting in orthogonal resources may include transmitting at different times and/or in different frequencies. An example of an interference-avoiding technique may include the use of orthogonal frequency-division multiple access (OFDMA) associated with LTE radio access networks.

Alternately or additionally, the aggressors may perform interference-controlling techniques. For example, the aggressors may share resources such as time and/or frequency channels used by one or more victims, and may control transmission powers in the shared resources such that the victims experience acceptable levels of interference.

Alternately or additionally, the terminals 308 may perform interference-mitigating techniques. For example, the terminals 308 may share information about their codebooks and/or message content to cooperate in mitigating mutual interference of the terminals 308. An example of an interference-mitigating technique may include the use of beamform nulling and/or multiple-input multiple-output (MIMO) channels associated with LTE radio access networks.

In some embodiments, an aggressor may perform interference-mitigating techniques to significantly reduce or eliminate the interference provided to the closest potential victims, described herein as mitigated victims. By way of example, the terminal 308a, when acting as an aggressor, may utilize MIMO channels and/or beamforming nulling to reduce the interference experienced by the terminal 308b, the terminal 308c, and the terminal 308d.

In some instances, it may be impractical to perform interference mitigation relative to all potential victims, which may result in unmitigated victims such as the terminal 308e, the terminal 308f, the terminal 308g, and the terminal 308h. In some embodiments, an aggressor may refrain from transmitting terminal-to-terminal communication in the same resource elements as are being used by the unmitigated victims to limit the amount of interference experienced by the unmitigated victims. However, a more efficient utilization of radio resources may be possible if the interference is controlled.

In some embodiments, an open-loop interference control may be used to control the amount of interference an aggressor imposes upon the unmitigated victims. The aggressor may estimate interference experienced at a closest unmitigated victim and may adjust a transmission power accordingly. The estimation may be based on an estimated distance to the closest unmitigated victim and an interference measurement taken at the location of the aggressor.

The open-loop interference control process may lack knowledge regarding precisely which unmitigated victims will be affected by the aggressor's transmissions. As a result, aggressors may be prompted to transmit at a conservative power level, potentially reducing overall system performance.

In some embodiments, a closed-loop interference control may further be used to allow victims of interference to transmit interference measurements and/or complaints to the superior node 302. In response to the interference measurements and/or the complaints, the superior node 302 may prompt aggressors to adjust the power levels of transmissions over one or more resource elements. The closed-loop interference control may allow aggressors to transmit at a less conservative power level, potentially increasing overall system performance.

Figure 4:
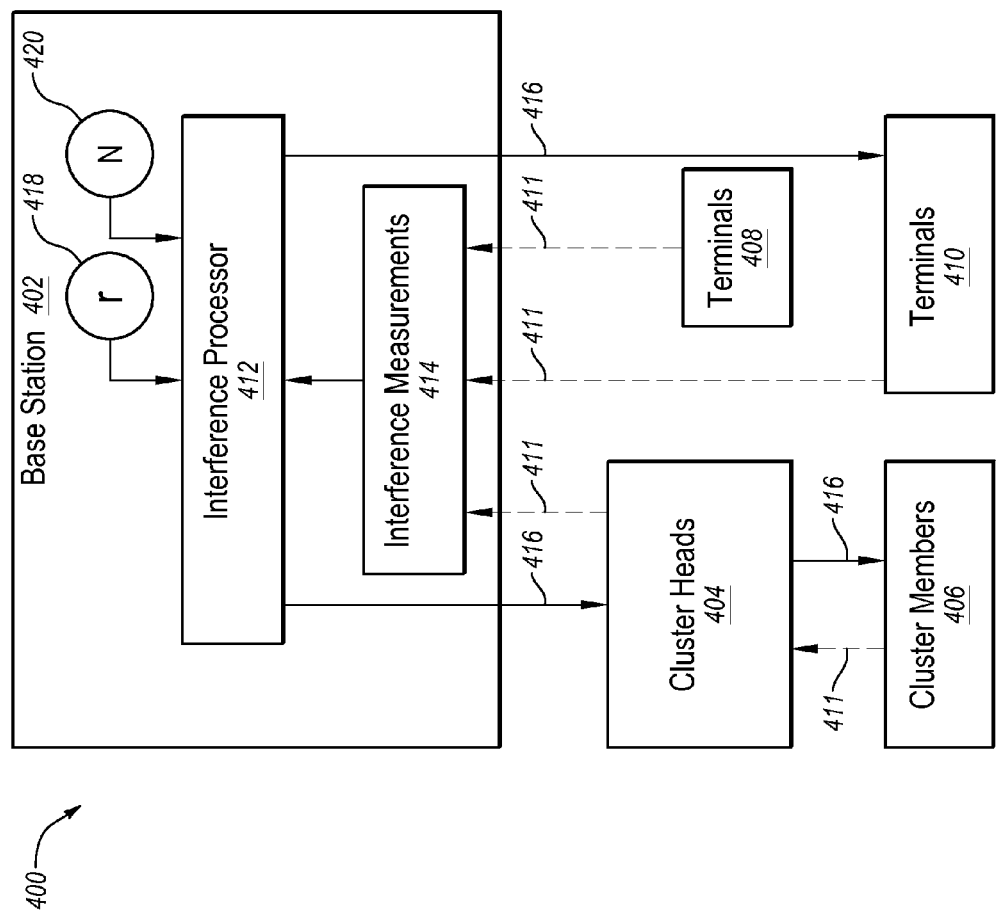
FIG. 4 is a diagrammatic view of an example interference management system that may be implemented in the telecommunication system of FIG. 1.

In some embodiments, the open-loop interference control process and the closed-loop interference control process may be performed for multiple resource elements associated with LTE radio access networks. In some instances, the open-loop interference control process and the closed-loop interference control process may be performed for resources elements that may be utilized by potential aggressors to transmit terminal-to-terminal transmissions as an underlay to an LTE radio access network. FIG. 4 is a diagrammatic view of an example interference management system 400 that may be implemented in the telecommunication system 100 of FIG. 1. The system 400 may include a base station 402 generally corresponding to the base station 102 of FIG. 1.

The system 400 may also include one or more cluster heads 404 and cluster members 406 generally corresponding, respectively, to the cluster head 202 and cluster members 206 of FIG. 2. The cluster members 406 may be engaged in terminal-to-terminal communication and/or radio communication generally corresponding, respectively, to the terminal-to-terminal communication 112 and the radio communication 110 of FIG. 1.

The system 400 may include one or more cellular-communication terminals 408 engaged in cellular communication generally corresponding to the radio communication 110 of FIG. 1. The system may also include one or more terminal-to-terminal-communication terminals 410 engaged in terminal-to-terminal communication and/or cellular communication generally corresponding, respectively, to the terminal-to-terminal communication 112 and the radio communication 110 of FIG. 1. The cellular-communication terminals 408, the terminal-to-terminal-communication terminals 410, and/or the cluster heads 404 may provide interference measurements 411 to the base station 402. In some instances, the cluster heads 404 may provide interference measurements 411 from the cluster members 406. Alternately or additionally, the cluster members 406 may provide interference measurements 411 directly to the base station 402.

The base station 402 may correspond to the superior node 302 of FIG. 3 and may include an interference processor 412. The interference processor 412 may consider interference measurements 414 originating from the cluster heads 404, the cellular-communication terminals 408, the terminal-to-terminal-communication terminals 410, and/or the cluster members 406 to determine interference parameters 416.

The interference parameters 416 may include a radius 418, represented by r, of a zone (not shown) associated with the base station 402. The radius 418 may generally correspond to the radius 306 of FIG. 3. The interference parameters 416 may alternately or additionally include a terminal number 420, represented by N, associated with a number of terminals, such as the cluster heads 404, the cluster members 406, the cellular-communication terminals 408, and/or the terminal-to-terminal-communication terminals 410 located in the zone associated with the base station 402. In some embodiments, the terminal number 420 may be associated with a number of terminals distributed within the zone according to a statistical model. For example, the terminal number 420 may be associated with a number of terminals located in the zone, in unknown positions that can be modeled through stochastic processes such as a Poisson Point Process (PPP).

The base station 402 may provide interference parameters 416 to subordinate nodes such as the cluster heads 404 and/or the terminal-to-terminal-communication terminals 410. The cluster heads 404 may provide the interference parameters 416 to the subordinate nodes such as the cluster members 406. Alternately or additionally, the base station 402 may provide the interference parameters 416 directly to the cluster members 406.

Figure 5:
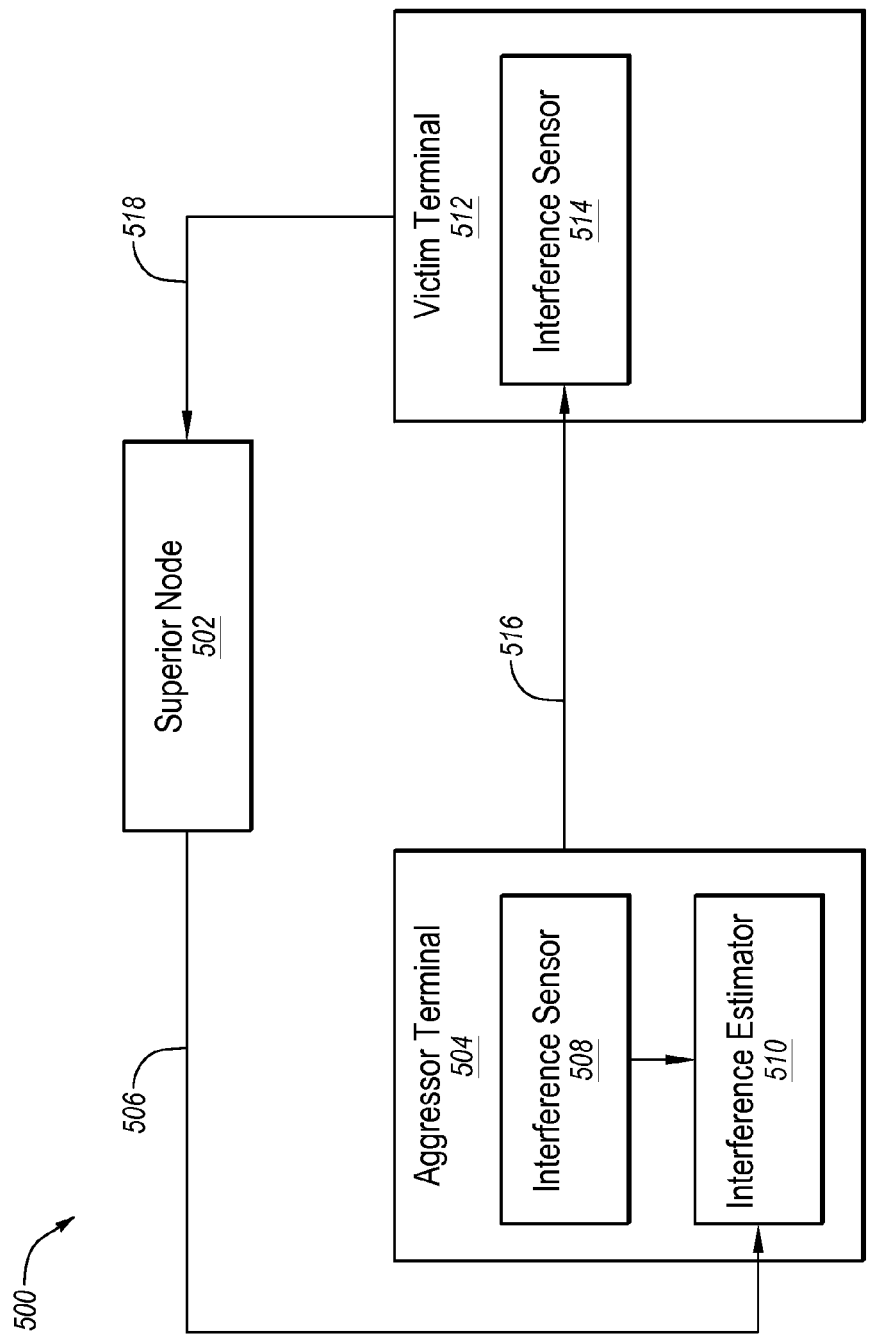
FIG. 5 is a diagrammatic view of another example interference management system that may be implemented in the telecommunication system of FIG. 1.

FIG. 5 is a diagrammatic view of another example interference management system 500 that may be implemented in the telecommunication system 100 of FIG. 1. The system 500 may include a superior node 502. The superior node 502 may generally correspond to the base station 102 of FIG. 1, the cluster head 202 of FIG. 2, the superior node 302 of FIG. 3, the base station 402 of FIG. 4, and/or the cluster heads 404 of FIG. 4.

The system 500 may further include an aggressor terminal 504. The aggressor terminal 504 may generally correspond to the terminals 104 of FIG. 1, the cluster members 206 of FIG. 2, the terminals 308 of FIG. 3, the cluster members 406 of FIG. 4, and/or the terminal-to-terminal-communication terminals 410 of FIG. 4. The aggressor terminal 504 may be configured to transmit terminal-to-terminal communication generally corresponding to the terminal-to-terminal communication 112 of FIG. 1 and/or the cluster-member-to-cluster-member communication 210 of FIG. 2. Although not shown, the system 500 may include additional aggressor terminals generally analogous to the aggressor terminal 504.

The system 500 may further include a victim terminal 512. Although not shown, the system 500 may include additional victim terminals generally analogous to the victim terminal 512. The victim terminal 512 may generally correspond to the terminals 104 of FIG. 1, the cluster members 206 of FIG. 2, the terminals 308 of FIG. 3, the cluster members 406 of FIG. 4, the cellular-communication terminals 408 of FIG. 4, and/or the terminal-to-terminal communication terminals 410 of FIG. 4.

The victim terminal 512 may be, at least initially, an unmitigated victim of the aggressor terminal 504. The aggressor terminal 504 may attempt to control the overall interference experienced by the victim terminal 512 by controlling the interference 516 the victim terminal 512 experiences from the aggressor terminal 504.

The superior node 502 may provide the aggressor terminal 504 with interference parameters 506. Although not shown, the superior node 502 may additionally send the interference parameters 506 to the victim terminal 512. The interference parameters 506 may generally correspond to the interference parameters 416 of FIG. 4. In some instances, the interference parameters 506 may be provided to the aggressor terminal 504 by way of an intermediary, such as a cluster head generally corresponding to the cluster head 202 of FIG. 2 and/or the cluster heads 404 of FIG. 4.

In some embodiments, the interference parameters 506 may include an interference threshold, which may be represented by a symbol $I_t$. Alternately or additionally, the interference threshold may be predefined and generally known by the aggressor terminal 504.

In some embodiments, the interference parameters 506 may include a signal having a format indicator and a message content. The format indicator may indicate the information that is being provided in the message content. By way of example, the format indicator may include three bits and the associated message content may include information as set forth in the following table. The interference parameters 506 may alternately or additionally include other formats and/or other message content.

| Format Indicator | Message Content |
|---|---|
| 0 | Terminal number. |
| 1 | Terminal number delta. |
| 2 | Zone radius. |
| 3 | Interference bias for a set of resource elements. |
| 4 | Interference bias delta for a set of resource elements. |
| 5 | Interference bias for one resource element. |
| 6 | Interference bias delta for one resource element. |
| 7 | Request for an interference measurement. |

In some embodiments, the interference parameters 506 may include a terminal number generally corresponding to the terminal number 420 of FIG. 4, as associated with the format indicator 0 of the above table. The terminal number may set a number of terminals in an associated zone. In some embodiments, the terminal number may be associated with a number of PPP-distributed terminals located in the associated zone.

Alternately or additionally, the interference parameters 506 may include a terminal number delta as associated with the format indicator 1 of the above table. The terminal number delta may represent a change in the number of terminals in the associated zone. In some embodiments, the terminal number delta may be associated with a change in the number of PPP-distributed terminals located in the associated zone. In some instances, the terminal number may set an initial number of terminals and the terminal number delta may be used to adjust the number of terminals up and/or down as the number of terminals in the associated zone change.

The interference parameters 506 may include a zone radius generally corresponding to the radius 418 of FIG. 4 and/or the radius 306 of FIG. 3, as associated with the format indicator 2 of the above table.

The interference parameters 506 may further include an interference bias for a set of resource elements as associated with the format indicator 3 of the above table. In some embodiments, the set of resource elements may include a predefined set of resource elements over which terminals may perform terminal-to-terminal communication generally corresponding to the terminal-to-terminal communication 112 of FIG. 1 and/or to the cluster-member-to-cluster-member communication 210 of FIG. 2.

The interference parameters 506 may alternately or additionally include an interference bias delta for the set of resource elements as associated with the format indicator 4 of the above table. In some embodiments, the message content of the interference bias delta for the set of resource elements may include a sign and a two-bit code indicating a decibel (dB) delta, such as a one-dB delta, a three-dB delta, a five-dB delta, and an eight-dB delta depending on the bit values. However, other codes and/or other dB deltas may alternately or additionally be used.

The interference parameters 506 may further include an interference bias for one resource element as associated with the format indicator 5 of the above table. Alternately or additionally, the interference parameters may include an interference bias delta for one resource element as associated with the format indicator 6 of the above table.

In some embodiments, the interference parameters 506 may include a request for an interference measurement as associated with the format indicator 7 of the above table. In some embodiments, the request for the interference measurement may include a format indicator of a requested response. For example, the request for an interference measurement may include a format indicator identifying one or more resource elements for which an interference measurement is requested. The interference measurements may generally correspond to the interference measurements 411 of FIG. 4.

The victim terminal 512 may include an interference sensor 514 for determining the amount of interference the victim terminal 512 experiences. The interference experienced by the victim terminal 512 may be influenced at least in part by interference 516 from the aggressor terminal 504.

The victim terminal 512 may send an interference message 518 to the superior node. Although not shown, the aggressor terminal 504 may alternately or additionally send an interference message analogous to the interference message 518 to the superior node 502. In some instances, the interference message 518 may include an interference measurement of the interference sensor 514 in response to a request for an interference measurement from the superior node 502. Alternately or additionally, the victim terminal 512 may send the interference message 518 unprompted by the superior node 502.

If the superior node 502 is a cluster head, the superior node 502 may relay the interference message 518 to a more superior node (not shown). In some embodiments, the superior node 502 may aggregate the interference message 518 with other interference messages received from other victim terminals (not shown), the aggressor terminal 504, and/or other aggressor terminals (not shown) before relaying an aggregated interference message to the more superior node.

In response to the interference message 518, the superior node 502 may send interference parameters 506 adjusting the interference bias to the aggressor terminal 504 and/or other aggressor terminals. By way of example, the victim terminal 512 may send an interference message 518 to the superior node 502 complaining of the level of interference experienced on one or more resource elements at the victim terminal 512. In response, the superior node 502 may send interference parameters 506 to the aggressor terminal 504 and/or other aggressor terminals subordinate to the superior node 502 with a message that the interference bias associated with the one or more resource elements is to be reduced by three dB. If the superior node 502 is a cluster head, the superior node 502 may also relay the interference message 518 to a more superior node, which may similarly provide interference parameters to other aggressor terminals.

The aggressor terminal 504 may include an interference sensor 508 and an interference estimator 510. The interference sensor 508 may determine an interference measurement at the location of the aggressor terminal 504. The interference sensor 508 may determine an interference measurement for each resource element of a range of resource elements associated with terminal-to-terminal communications. Alternately or additionally, the interference sensor 508 may determine an interference measurement for one or more particular resource elements associated with terminal-to-terminal communications. For example, the interference sensor 508 may determine an interference measurement for resource elements that the aggressor terminal 504 intends to use to transmit terminal-to-terminal transmissions.

In some embodiments, the interference sensor 508 may determine interference measurements based at least in part on a channel-quality indicator (CQI) associated with LTE radio access networks. Alternately or additionally, the interference sensor 508 may determine interference measurements based at least in part on an interference measurement resource (IMR) associated with LTE radio access networks.

The interference estimator 510 may calculate a maximum transmission power for one or more resource elements at which the aggressor terminal 504 may transmit a terminal-to-terminal transmission via the one or more resource elements. The maximum transmission power may be associated with a level of interference 516 that the aggressor terminal 504 estimates will be acceptable to impose upon the victim terminal 512.

In some embodiments, the maximum transmission power for a resource element k, represented by $T_{max,k}$, may be calculated according to the following Formula 1.

$$T_{max,k} = a_k(I_t - I_{m,k}) + b_k \quad \text{Formula 1:}$$

The symbol $a_k$ may represent a path loss factor associated with the resource element k. The symbol $I_t$ may represent an interference threshold that the victim terminal 512 may consider an acceptable level of total interference over the resource element k. The symbol $I_{m,k}$ may represent an interference measurement of the resource element k by the interference sensor 508. The symbol $b_k$ may represent the interference bias associated with the resource element k.

In some embodiments, the interference bias $b_k$ may be included in the interference parameters 506. The superior node 502 may update $b_k$ via the interference parameters 506 to adjust the maximum transmission power calculations of the aggressor terminal 504. For example, the superior node 502 may prompt the aggressor terminal 504 to transmit with a relatively higher maximum transmission power by increasing $b_k$. Alternatively, the superior node 502 may prompt the aggressor terminal 504 to transmit with a relatively lower maximum transmission power by decreasing $b_k$. The value of $b_k$ may be increased or decreased according to the interference message 518.

In some embodiments, the $a_k$ may be estimated by the aggressor terminal based on the zone radius and the terminal number included in the interference parameters 506. For example, the $a_k$ may be estimated according to the following Formula 2.

$$a_k = \left(\frac{\lambda_k}{4\pi \tilde{d}}\right)^2 \quad \text{Formula 2}$$

The symbol $\lambda_k$ may represent a wavelength of the carrier waveform of resource element k. The symbol $\tilde{d}$ may represent an estimated distance to a nearest unmitigated victim generally corresponding to the victim terminal 512.

In some embodiments, the estimated distance may be calculated via distance estimation techniques. For example, an estimated distance may be selected with a 5% tolerance via the following Formulas 3, 4, and 5.

$$\tilde{d} = F_{L,min}(0.95) \quad \text{Formula 3}$$

$$F_{L,min} = 1 - [1 - F_L(l)]^{N-1} \quad \text{Formula 4}$$

$$F_L(l, r) = 1 + \frac{2}{\pi}\left(\frac{l^2}{r^2} - 1\right)\cos^{-1}\frac{l}{2r} - \frac{l}{\pi r}\left(1 + \frac{l^2}{2r^2}\right)\sqrt{1 - \frac{l^2}{4r^2}} \quad \text{Formula 5}$$

The symbol l may represent the distance to the closest node. The symbol N may represent the number of PPP-distributed terminals in a zone. The symbol r may be the radius of the zone. In some embodiments, r and N may generally correspond, respectively, to the zone radius 418 and the terminal number 420 of FIG. 4.

Figure 6:
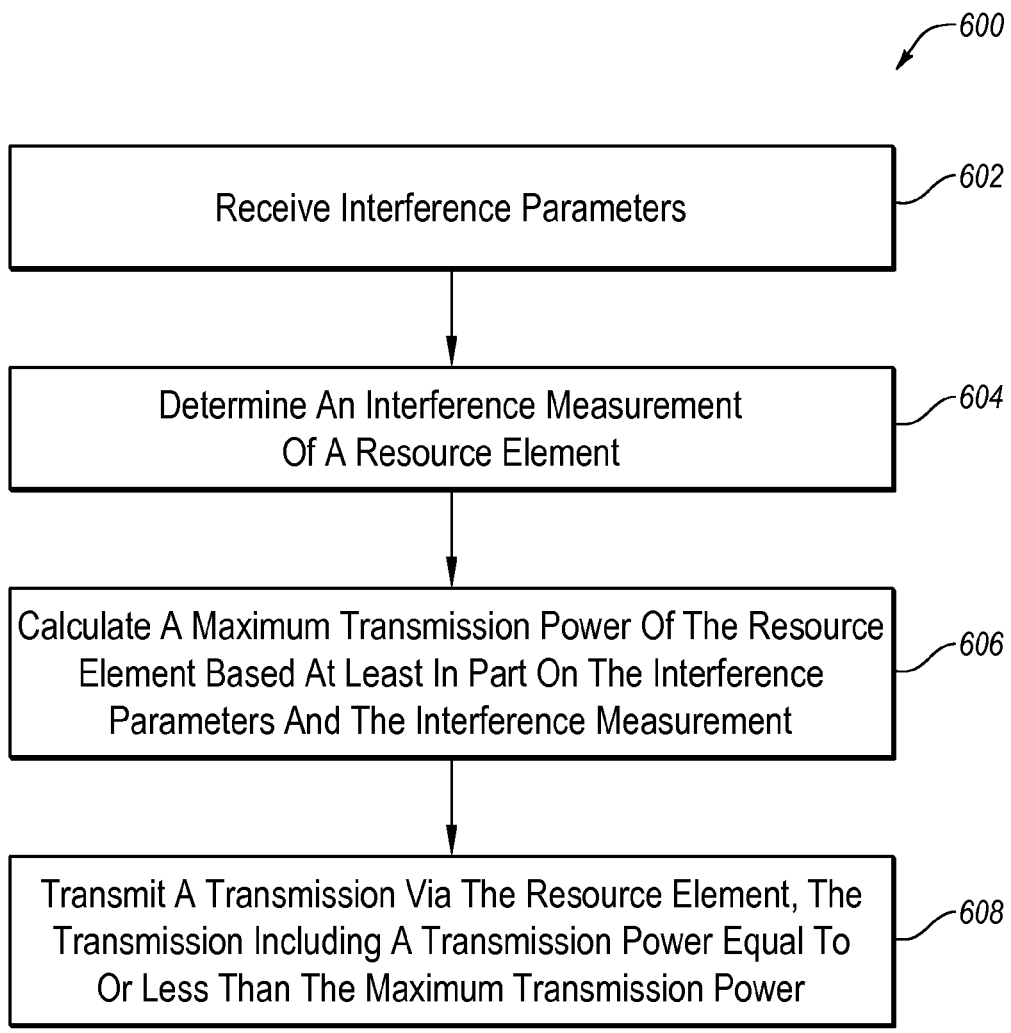
FIG. 6 is a flowchart of an example method of controlling interference that may be implemented in the telecommunication system of FIG. 1.

FIG. 6 is a flowchart of an example method 600 of controlling interference that may be implemented in the telecommunication system 100 of FIG. 1. In some embodiments, the method 600 may be performed by a terminal generally corresponding to the terminals 104 of FIG. 1, and/or by an aggressor terminal such as the aggressor terminal 504 of FIG. 5.

The method 600 may begin at block 602 by receiving interference parameters. The interference parameters may generally correspond to the interference parameters 416 of FIG. 4 and/or the interference parameters 506 of FIG. 5. In some embodiments, the interference parameters may include a radius associated with a zone of a superior node and a terminal number associated with a number of terminals located within the zone of the superior node. The terminal number may be associated with a number of PPP-distributed terminals located within the zone of the superior node.

In some embodiments, the interference parameters may include an interference bias associated with the resource element. In some instances, the interference bias may be associated with multiple resource elements.

The method 600 may continue at block 604 by determining an interference measurement of a resource element. The interference measurement may be associated with a first location. In some embodiments, determining the interference measurement may be based at least in part on a CQI. Alternately or additionally, determining the interference measurement may be based at least in part on an IMR.

The method may continue at block 606 by calculating a maximum transmission power of the resource element based at least in part on the interference parameters and the interference measurement. In some embodiments, calculating the maximum transmission power of the resource element may include calculating a path loss factor. Calculating the path loss factor may include estimating a distance to a closest victim.

In some embodiments, the maximum transmission power, represented by $T_{max,k}$, for a resource element, represented by k, may be based at least in part on the calculation of the following Formula 6.

$$T_{max,k} = a_k(I_t - I_{m,k}) - b_k \quad \text{Formula 6:}$$

In Formula 6, $a_k$ may include the path loss factor associated with the resource element k. The term $I_t$ may include an interference threshold. The term $I_{m,k}$ may include the interference measurement of the resource element k. The term $b_k$ may include the interference bias associated with the resource element k.

The method 600 may continue at block 608 by transmitting a transmission via the resource element, the transmission including a transmission power equal to or less than the maximum transmission power.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 600 may further include receiving second interference parameters and calculating an updated maximum transmission power of the resource element based at least in part on the second interference parameters.

In some embodiments, the second interference parameters may include a second interference bias associated with the resource element. Alternately or additionally, the second interference parameters may include an interference bias delta. Calculating the updated maximum transmission power of the resource element may include adjusting the interference bias by the interference bias delta.

In some embodiments, the interference parameters may include a first terminal number associated with a first number of terminals located within a zone of a superior node at a first time and the second interference parameters may include a second terminal number associated with a second number of terminals located within the zone at a second time.

Alternately, the interference parameters may include a first terminal number associated with a first number of terminals located within a zone of a superior node at a first time and the second interference parameters may include a terminal number delta associated with a change in the number of terminals located within the zone at a second time, the change in the number of terminals being relative to the first number of terminals.

In some embodiments, the method 600 may further include receiving a request for an interference measurement and transmitting an interference measurement.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of controlling interference, the method comprising:
   receiving interference parameters, including an interference bias associated with a resource element k;
   determining an interference measurement of the resource element k, the interference measurement associated with a first location;
   calculating a maximum transmission power of the resource element k based at least in part on a calculation of:

$a_k(I_t - I_{m,k}) - b_k$ wherein:
   $a_k$ includes a path loss factor associated with the resource element k,
   $I_t$ includes an interference threshold,
   $I_{m,k}$ includes the interference measurement of the resource element k, and
   $b_k$ includes the interference bias associated with the resource element k; and
   transmitting a transmission via the resource element, the transmission including a transmission power equal to or less than the maximum transmission power.

2. The method of claim 1, wherein determining the interference measurement is based at least in part on a channel-quality indicator (CQI).

3. The method of claim 1, wherein determining the interference measurement is based at least in part on an interference measurement resource (IMR).

4. The method of claim 1, wherein the interference parameters include a radius associated with a zone of a superior node and a terminal number associated with a number of terminals located within the zone of the superior node.

5. The method of claim 1, wherein the interference parameters include a radius associated with a zone of a superior node and a terminal number associated with a number of terminals distributed within the zone of the superior node according to a statistical model.

6. The method of claim 1, wherein calculating the maximum transmission power of the resource element includes calculating the path loss factor.

7. The method of claim 6, wherein calculating the path loss factor includes estimating a distance to a closest victim.

8. The method of claim 1, wherein the interference bias is further associated with a plurality of resource elements including the resource element.

9. The method of claim 1, further comprising:
   receiving second interference parameters; and
   calculating an updated maximum transmission power of the resource element based at least in part on the second interference parameters.

10. The method of claim 9, wherein the second interference parameters include a second interference bias associated with the resource element.

11. The method of claim 9, wherein the second interference parameters include an interference bias delta and calculating the updated maximum transmission power of the resource element includes adjusting the interference bias by the interference bias delta.

12. The method of claim 9, wherein the interference parameters include a first terminal number associated with a first number of terminals located within a zone of a superior node at a first time and the second interference parameters include a second terminal number associated with a second number of terminals located within the zone of the superior node at a second time.

13. The method of claim 9, wherein the interference parameters include a first terminal number associated with a first number of terminals located within a zone of a superior node at a first time and the second interference parameters include a terminal number delta associated with a change in the number of terminals located within the zone of the superior node relative to the first number of terminals.

14. The method of claim 1, further comprising:
   receiving a request for an interference measurement;
   obtaining the interference measurement; and
   transmitting the interference measurement.

15. A terminal including a non-transitory computer-readable medium having encoded therein programming code executable by a processor to perform operations comprising:
   receiving interference parameters, including an interference bias associated with a resource element k;
   determining an interference measurement of the resource element k, the interference measurement associated with a first location;
   calculating a maximum transmission power of the resource element k based at least in part on a calculation of:

$a_k(I_t - I_{m,k}) - b_k$ wherein:
   $a_k$ includes a path loss factor associated with the resource element k,
   $I_t$ includes an interference threshold,
   $I_{m,k}$ includes the interference measurement of the resource element k, and
   $b_k$ includes the interference bias associated with the resource element k; and
   transmitting a transmission via the resource element, the transmission including a transmission power equal to or less than the maximum transmission power.

16. The terminal of claim 15, wherein the interference parameters further include a radius associated with a zone of a superior node and a terminal number associated with a number of terminals located within the zone of the superior node.

17. The terminal of claim 15, wherein:
   calculating the maximum transmission power of the resource element includes calculating the path loss factor; and calculating the path loss factor includes estimating a distance to a closest victim.

18. The terminal of claim 15, the operations further comprising:
receiving second interference parameters; and
calculating an updated maximum transmission power of the resource element based at least in part on the second interference parameters.

19. A method of controlling terminal-to-terminal interference in a telecommunication network, the method comprising:
receiving, at a terminal of the telecommunication network, interference parameters, including an interference bias associated with a resource element k;
determining, at the terminal, an interference measurement of the resource element k, the interference measurement associated with a first location;
calculating, at the terminal, a maximum transmission power of the resource element k based at least in part on a calculation of:

$a_k(I_t - I_{m,k}) - b_k$ wherein:
$a_k$ includes a path loss factor associated with the resource element k,
$I_t$ includes an interference threshold,
$I_{m,k}$ includes the interference measurement of the resource element k, and
$b_k$ includes the interference bias associated with the resource element k; and
transmitting, from the terminal, a transmission via the resource element, the transmission including a transmission power equal to or less than the maximum transmission power.

* * * * *